United States Patent [19]

Eichenlaub

[11] Patent Number: 5,036,385
[45] Date of Patent: Jul. 30, 1991

[54] AUTOSTEREOSCOPIC DISPLAY WITH MULTIPLE SETS OF BLINKING ILLUMINATING LINES AND LIGHT VALVE

[75] Inventor: Jesse B. Eichenlaub, Rochester, N.Y.

[73] Assignee: Dimension Technologies, Inc., Rochester, N.Y.

[21] Appl. No.: 329,589

[22] Filed: Mar. 28, 1989

Related U.S. Application Data

[63] Continuation-in-part of Ser. No. 119,907, Nov. 11, 1987, Pat. No. 4,829,365, which is a continuation-in-part of Ser. No. 837,279, Mar. 7, 1986, Pat. No. 4,717,949.

[51] Int. Cl.$^5$ .................... H04N 15/00; H04N 13/00
[52] U.S. Cl. ............................ 358/3; 358/88
[58] Field of Search .............. 358/3, 88, 90; 340/794, 340/795, 729; 350/130, 131

[56] References Cited

U.S. PATENT DOCUMENTS

| | | | |
|---|---|---|---|
| 4,214,257 | 7/1980 | Yamauchi | 358/3 |
| 4,641,178 | 2/1987 | Street | 358/3 |
| 4,717,949 | 1/1988 | Eichenlaub | 358/88 |
| 4,829,365 | 5/1989 | Eichenlaub | 358/88 |
| 4,872,750 | 10/1989 | Morishita | 358/3 |
| 4,959,641 | 9/1990 | Bass et al. | 358/3 |

Primary Examiner—James J. Groody
Assistant Examiner—Wendy R. Greening
Attorney, Agent, or Firm—Robert M. Phipps

[57] ABSTRACT

A video display employs a flat surface upon which is displayed more than one set of thin, blinking light emitting sites. A transmissive light valve in front of the surface is capable of displaying images by means of varying the transparency of individual picture elements arranged in a grid pattern across its surface, and of displaying different images as different sets of light emitting lines blink on. The surface and light valve are arranged in such a way that an observer always sees each of the light emitting lines through one set of pixels with the left eye and another set of pixels with the right eye. The display is normally an autostereoscopic display, but it can be also made as a high resolution two dimensional display.

26 Claims, 10 Drawing Sheets

AUTOSTEREOSCOPIC DISPLAY WITH MULTIPLE SETS OF BLINKING ILLUMINATING LINES AND LIGHT VALVE

RELATED APPLICATIONS

This application is a continuation in part of application Ser. No. 119,907 filed Nov. 11, 1987 now U.S. Pat. No. 4,829,365, which in turn is a continuation in part of application Ser. No. 837,279 filed Mar. 7, 1986 now U.S. Pat. No. 4,717,949.

BACKGROUND

1. Field of the invention

This invention relates to an autostereoscopic display device for use in television, computer graphics, and the like viewing applications.

2. Prior Art

My prior U.S. Pat. No. 4,717,949 describes an autostereoscopic display that uses stationary light emitting lines in combination with an image displaying light valve to produce stereoscopic images that can be seen without the use of glasses by the observer. That display can be used either to produce a stereoscopic pair of images that can be seen only from a narrow vertical area situated directly in front of the screen, or a number of different images with different perspectives, that can be seen from a wide angles in front of the screen, and can give a hologram-like look around capability to the observer. Unfortunately, when used in the latter mode, and given a light valve with a certain number of pixels, the number of emitting lines must be reduced, so that several columns of pixels are situated in front of each line, each column displaying part of a perspective view appropriate to some zone in front of the device. This results in a loss of resolution by a factor f equal to the number of viewing zones that the display produces.

My still earlier U.S. Pat. No. 4,367,486 describes a system using a single, moving light emitting point in combination with an image producing light valve to produce a hologram like image with a large number of zones. This display device does not suffer from the trade off between number of zones and resolution that the device of U.S. Pat. No. 4,717,949 would. It would take full advantage of the resolution of the light valve when producing 3-D images. However, a device having high resolution would have to operate at the extremely high data transfer rates and employ a light valve with an extremely high frame rate in order to produce images. A high resolution device of this type would thus be very difficult and costly to build using today's technology.

Unfortunately the devices of each patent, U.S. Pat. Nos. 4,717,949 and 4,367,486, lack features which are deemed desirable by current technology.

Accordingly it is an object of this invention to provide a device capable of displaying three dimensional images that can be viewed with appropriate perspective from several locations in front of the device.

It is a further object of this invention to provide a thin, compact, and lightweight display capable of producing three dimensional images.

It is still a further an object of this invention to provide a display that is capable of taking full advantage of the resolution of a light valve array when producing three dimensional images.

It is yet another object of this invention to supply a display that can display images in such a manner that a large number of people sitting at various places in front of it can all see the images.

Yet still another object of this invention is to provide means of increasing the resolution of a transmissive display without increasing the number of pixels on the display.

Still other objects will be apparent to those skilled in the art upon reference to the following detailed description.

SUMMARY OF THE INVENTION

In accordance with this invention there is provided in an electronic display unit for autostereoscopic viewing or two dimensional high resolution viewing the improvement which comprises (a) a surface that is capable of emitting light from two or more sets of sites, (b) means of causing each set to blink on and then off in succession, one set after the other, and to repeat this process continuously, whenever the unit is turned on, and (c) a light valve in front of and parallel to said surface, said light valve having individual picture elements on its surface, said light valve being capable of displaying a different set of images every time a different set of light emitting sites flash on.

DESCRIPTION OF THE PREFERRED EMBODIMENT

Figure 1:
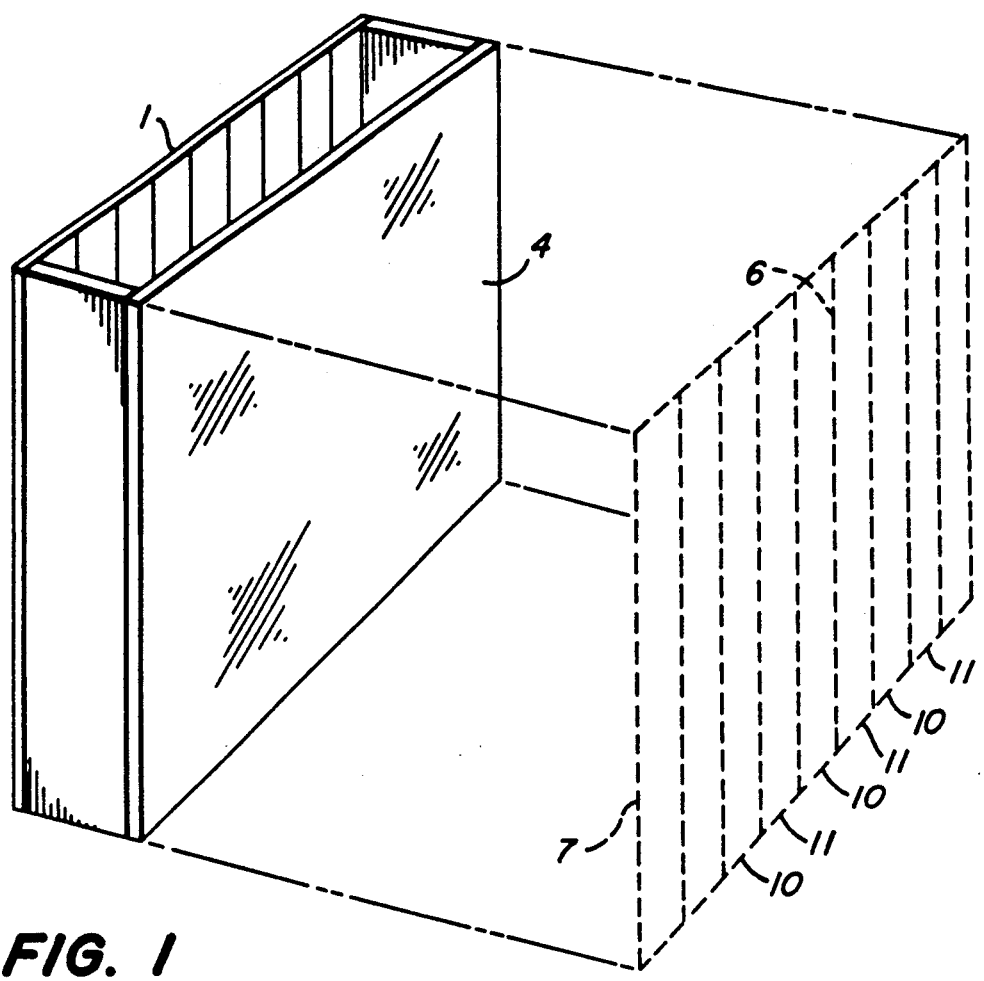
FIG. 1 is a perspective view of the autostereoscopic display unit of this invention.
Figure 2:
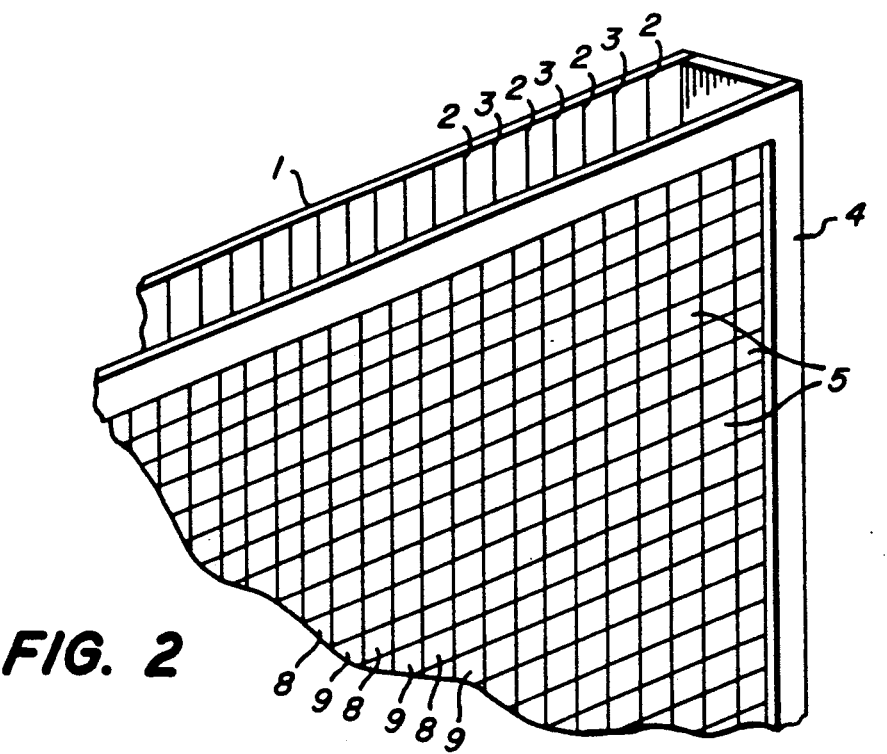
FIG. 2 is an expanded view of a portion of the display unit of FIG. 1.
Figure 3:
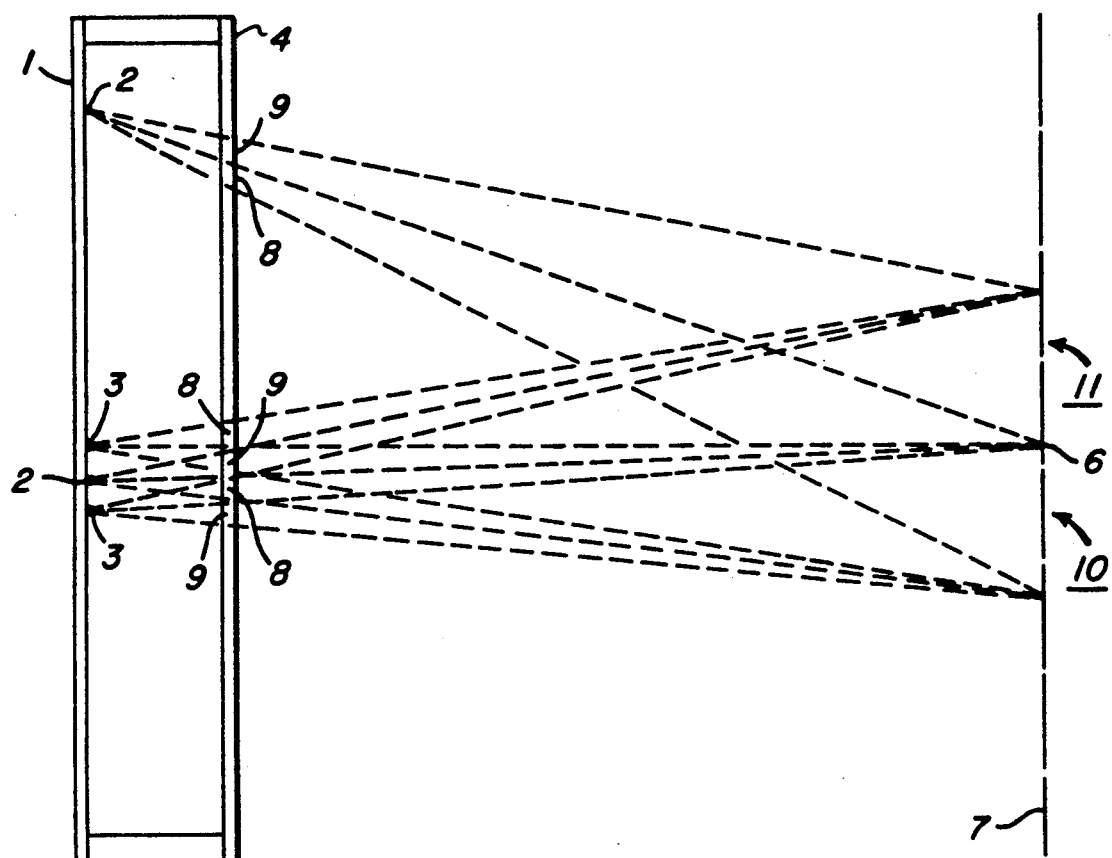
FIG. 3 illustrates the geometry and optical characteristics of the invention when viewing the top of the display unit of FIG. 1.

FIGS. 1, 2 and 3 illustrate the invention. FIG. 1 is a perspective view of the whole device, FIG. 2 is an expanded view of part of the display device, and FIG. 3 is a top view of the unit. As in my co-pending application, Ser. No. 119,907, an illumination panel 1, possessing a plurality of light emitting vertical lines, 2 and 3, is situated behind and spaced apart from a light valve array 4. The light valve array 4 is transmissive, and forms images by varying the transmissivity of individual picture elements 5. Usually these picture elements, or pixels 5 are arranged in straight rows and columns, with a certain number, m, of rows across the horizontal dimension and a certain number, n, of rows across the vertical dimension. When using most present day commercially produced transmissive displays, the ideal distance between the illumination panel and the transmissive pixels is on the order of 5 mm. The illuminating lines as shown in FIG. 2 consist of two sets, 2 and 3. Each set of lines is situated such that, as seen from a line 6, in viewing plane 7, each light emitting line appears to be directly behind the boundary of two columns of pixels, 8 and 9. For the purposes of this invention a vertical row of light sites in an illumination panel 1 is interchangeable with column of light sites in an illumination panel 1 and both expressions are interchangeable with a light arrangement in a straight line from the top to the bottom of the illumination panel 1.

Means is provided to cause each set of lines 2 and 3 to blink on and off very rapidly, or appear to do so, in such a manner that set 2 is on when set 3 is off, and vice versa. Electronic and mechanical means of achieving this are well known in the art and further discussion is not now required. To an observer in front of panel 1, this would give the illusion that light emitting lines are "jumping" back and forth between locations 2 and locations 3. However, in actual operation the lines will blink on and off at the rate of at least 30 times per second, making the blinking too fast to be detected by the observer, who will see what appear to be steadily shining lines.

Light valve 4 is synchronized with illuminating panel 1 by means of appropriate circuitry and or electronics, which is well know in the art, in such a manner that, when lines 2 are on, columns 8, in front of and to the left of lines 2, are displaying parts of a left eye image of some scene, and columns 9, in front of and to the right of lines 2, are displaying parts of a right eye image of the same scene . While lines 2 are on, the optical geometry of the device is identical to the geometry of the device of my previous U.S. Pat. No. 4,717,949 and an observer with his left eye in zone 10 and his right eye in zone 11 will see a stereoscopic image with the illusion of depth. One sixtieth of a second (or less) later, when lines 2 are off and lines 3 are on, columns 8, which are now in front of and to the right of the illuminating lines 3, display part of a right eye image, instead of a left eye image, and columns 9, in front of and to the left of lines 3, display a left eye image. Again, the observer, situated with his left eye in zone 10 and his right eye in zone 11, sees a stereoscopic image. The observer's left eye, in zone 10, thus first sees lines 2 through columns 8, and thus sees only the image displayed on columns 8. The resolution of this image in the horizontal direction is n/2, where n is the number of pixel columns on the light valve. One sixtieth of a second later, the observer sees lines 3 through columns 9, which previously were invisible. Thus, through the 1/30th second cycle, the observer's left eye sees a left eye image formed by all the pixels on the light valve. This image has full resolution n in the horizontal direction. The same is true of the observer's right eye. Thus, the observer sees a stereoscopic image with full resolution m by n.

As shown in FIGS. 1–3 the illuminating panel 1 and light valve array 4 are flat. However, it is within the scope of this invention to also employ curved surfaces provided the curvature is small and the curvature of both panel 1 and valve 4 provide a constant spacing.

A mask, (not shown) identical to the one disclosed in my co-pending application, Ser. No. 119,907 now U.S. Pat. No. 4,829,365, can be used to cause the left eye to see only alternate rows of pixels, instead of alternate columns, and the right eye to see the remaining rows. Such an arrangement would make the device compatible with the software developed for use with the polarized liquid crystal device (LCD) sheet/ polarized glasses systems that are designed for use with high frame rate cathode ray tubes (CRTs), such as the systems marketed by the Stereographics Corporation and Tektronics Corporation.

The use of moving lines can be extended to the production of several zones in front of light array panel 4, with a different full resolution perspective view seen from within each zone, producing a hologram-like effect that allows the user to move his or her head to see an object from different perspectives.

Figure 4:
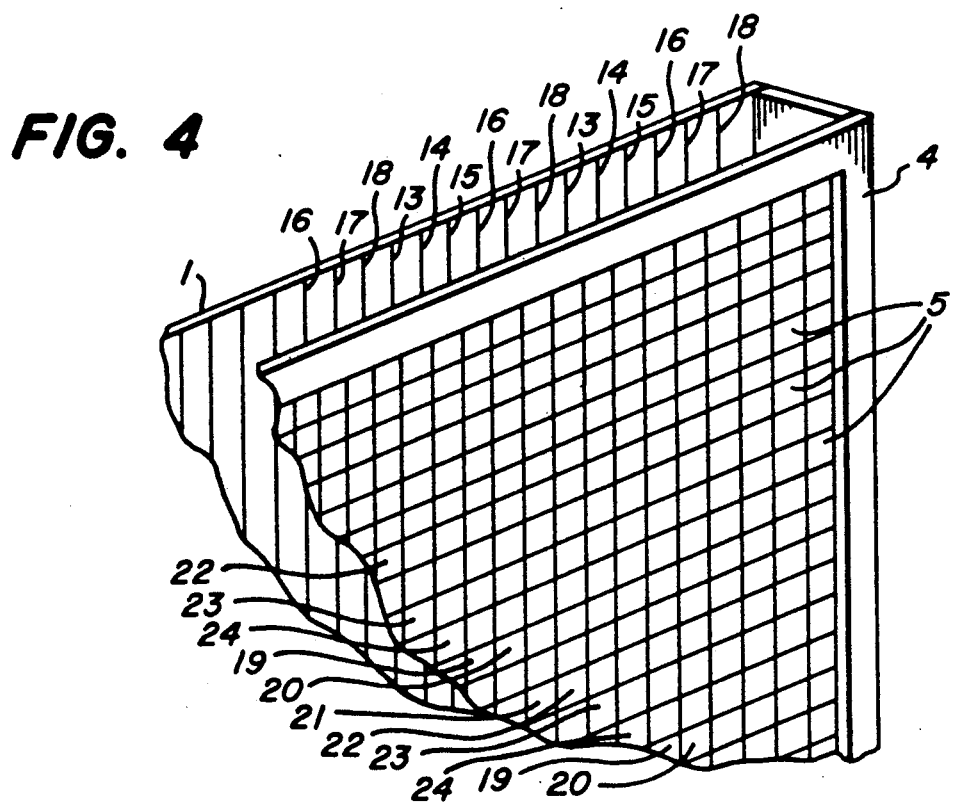
FIG. 4 is a close up view of a variation of the display unit of FIG. 2 with a greater number of line sets in the display.

FIG. 4 illustrates this variation of the invention. Here, there are several sets of light emitting lines, 13, 14, 15, 16, 17, and 18 on panel 1. In this figure six sets of lines are shown, but in practice any number of sets from 3 to several hundred sets could be used. Each line again is situated behind the boundaries between pixel columns 19 and 20, 20 and 21, 21 and 22, 22 and 23, and 23 and 24 as seen from any point on line 6. At any given instant only one set of lines 13, 14, . . . is on, the rest being turned off and dark. Furthermore, each line remains on for only a short period of time, equal to 1/6 of one on-off blinking cycle or less. Additionally, the lines are synchronized so that first lines 13 turn on, then lines 13 turn off, then lines 14 turn on, then lines 14 turn off, then lines 15 turn on, then lines 15 turn off, and so on. When lines 18 turn off, lines 13 turns on again, and the cycle repeats. If the lines were turning on and off slowly enough, an observer in front of panel 2 would see a set of lines that appeared to move or jump continuously across the screen in one direction. The effect would be similar to the illusion of moving lights that one sees when looking at a theater marquee. However, the lights are timed to blink at least 30 times a second, so an observer in front of panel 1 would see all the sets apparently shining continuously. It would also be possible in some situations to create lines that move continuously across panel 1, for example by projecting them onto panel 1 through a rotating mirror, but such a method is more complicated.

Figure 5:
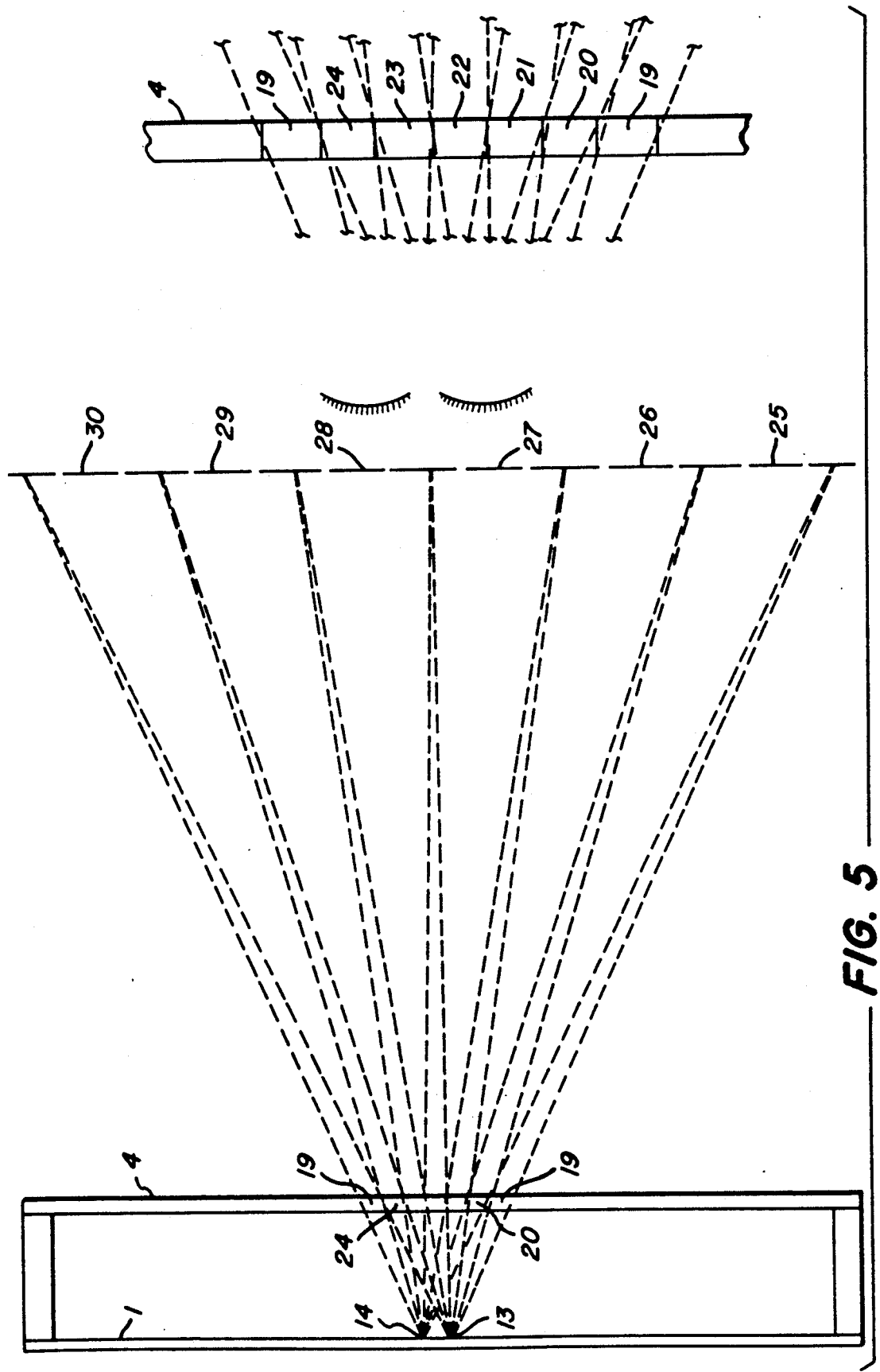
FIG. 5 illustrates the geometry and optical characteristics of the invention when viewing the top of the display unit of FIG. 4.

FIG. 5 illustrates the geometry of this version. Here, line sets 13 are shown in the on state. Again, a number of viewing zones, in this case six, marked 25, 26, 27, 28, 29 and 30, are situated in plane 7. The lines 13 are visible through pixel columns 19 from any point within zone 25, they are visible through columns 20 from any point within zone 26, and so on. While lines 13 are on, the pixel columns 19 display parts of an image with perspective appropriate to viewing from zone 25, columns 20 display parts of the same image with a slightly different perspective, appropriate to zone 26, and so on. The geometry and operation when lines 13 are on is thus identical to the operation of the multi zone variation of the device described in U.S. Pat. No. 4,717,949. The lines 14 are now visible through pixel columns 20 from zone 25, from columns 21 from zone 26, and so on. The lines are visible through columns 19 from zone 30, as shown in FIG. 5. Thus, when lines 13 turn off and lines 14 turn on, the images on light valve 4 change, so that while lines 14 are on, pixel columns 20 display other parts of an image with perspective appropriate to zone 25, columns 21 display parts of an image with perspective appropriate to zone 26, and so on. As different sets of lines come on, an observer's eye in zone 25 will see sets of illuminating lines successively through pixel columns 19, 20, 20, 21, 22, 23, and 24. These columns will display successive parts of the scene with perspective appropriate to zone 25, and thus, through the 1/30th second cycle, the observer's eye in zone 25 will see a complete perspective scene built up across all the columns of display 2, with full resolution of m by n. The same will be true within any other zone, so that as the observer moves his or her head back and forth, the perspective of the scene will seem to change, just as the perspective of a real objects would, and from all positions the observer will see a scene with full m by n resolution.

As noted before, the number of line sets can be increased. Given a light valve of resolution m by n and provided that one wishes to provide full resolution m by n images, the number of viewing zones produced at plane 7 by the device will be equal to the number of line sets. A special case occurs in the extreme when the number of line sets is equal to the number of pixel columns, n. In such a case, the number of zones in plane 7 will also equal n, and, if the illumination panel is the same size as the light valve, only one line will be on at any given time, and this single vertical line will appear to scan repeatedly across the panel in a horizontal direction.

Figure 6:
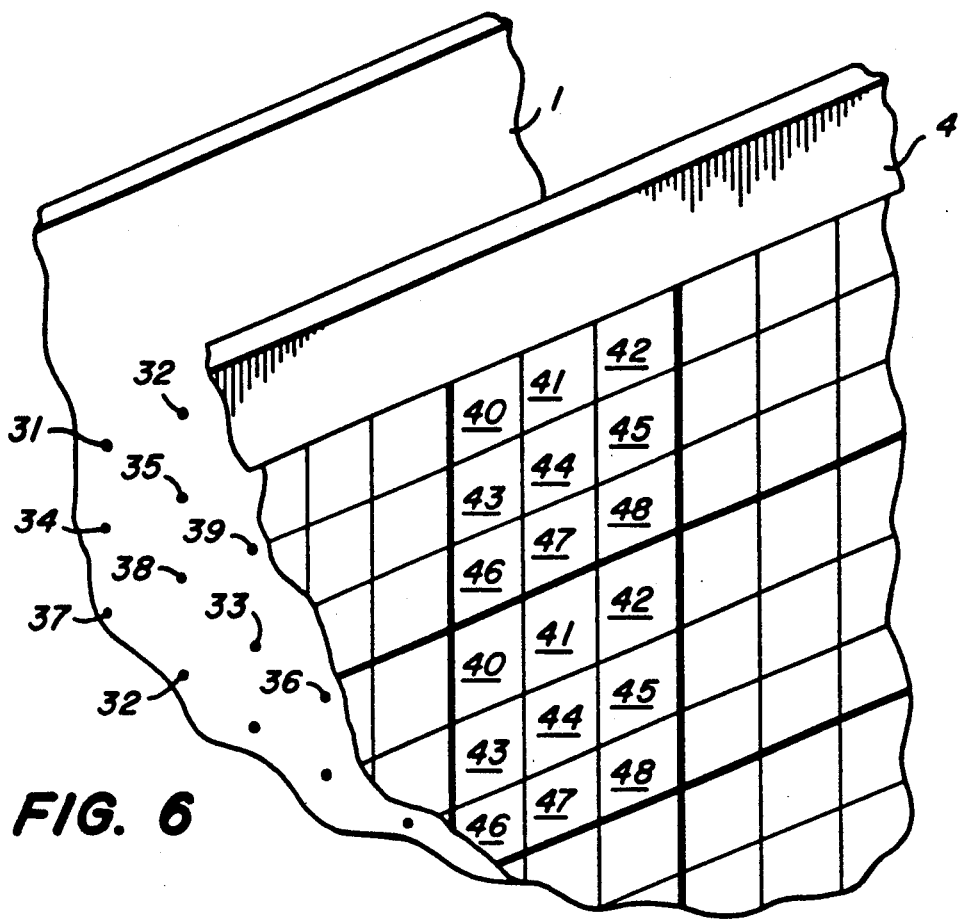
FIG. 6 is an expanded view portion of a variation of the invention that uses blinking or moving points of light on its illumination panel, instead of moving lines.

FIG. 6 illustrates a variation of the invention that uses a plurality of light emitting dots instead of lines, to provide changes in perspective as the observer moves up and down, in addition to when the observer moves sideways, thus giving a true holographic effect. In FIG. 6, panel 1 possesses several sets of light emitting locations 31, 32, 33, 34, 35, 36, 37, 38 and 39 arranged in a raster pattern as shown. Although nine sets of emitting locations are shown, any number from four to several hundred could be used in practice. At any given moment, only one set of emitting locations is on, in this case set 31. A light valve 4, possessing independently controllable pixels 40, 41, 42, 43, 44, 45, 46, 47 and 48 is situated in front of illuminating panel 1. Light emitting locations 31, 32, 33 etc. blink on and off, in such a way that only one set is on at any given moment. Ideally, they should be synchronized in such a way that first set 31 turns on, then just after set 31 turns off set 32 turns on, then 33, 34 and so on, so that an observer in front of panel 1 would see a large number of light emitting locations that seem to move or jump from location to location in scanning pattern, similar to the pattern used by an electron beam scanning a cathode ray tube.

Figure 7:
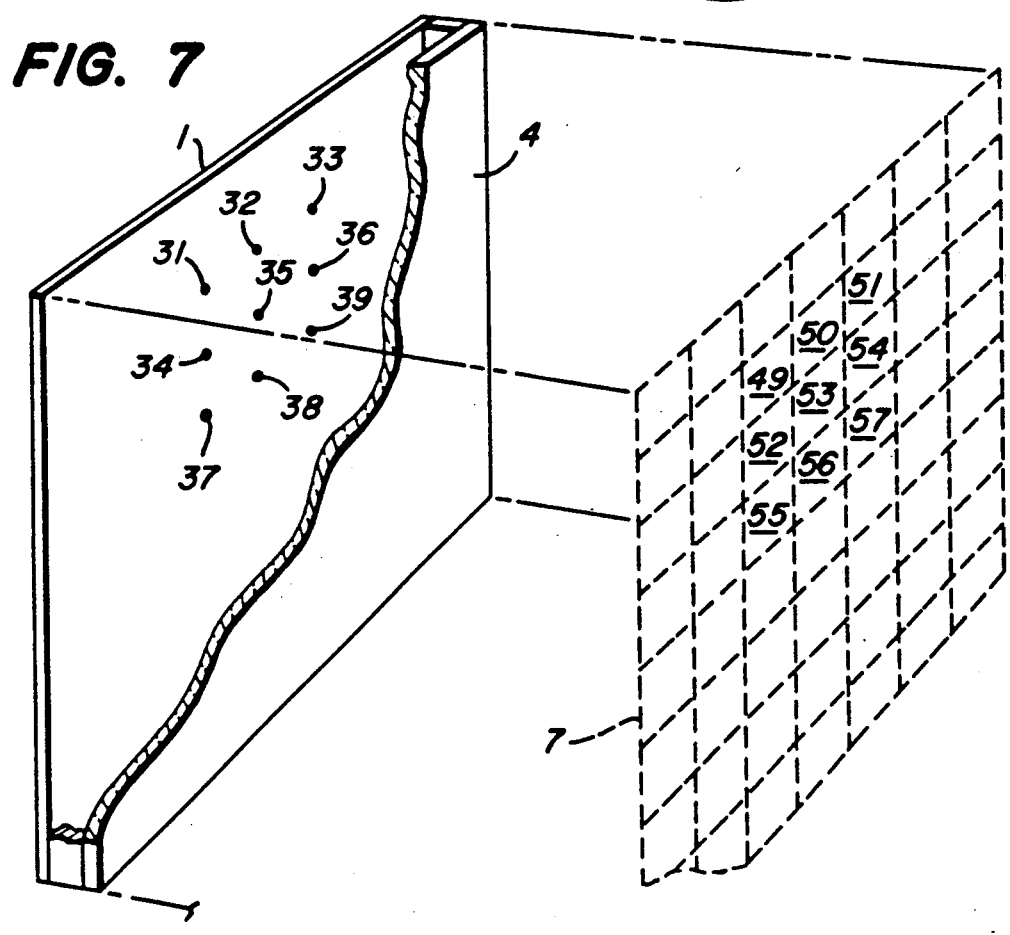
FIG. 7 illustrates the geometry and optical characteristics of the display unit of FIG. 6.

FIG. 7 further illustrates the geometry of the invention. When light emitting locations 31 on the illumination panel 1 are on as shown, An observer's eye in zone 49 of the viewing plane 7 will see the locations 31 through pixel sets 40, an observer's eye in zone 50 will see the locations 31 through pixel sets 41, and so on until location 39 through pixel set 48 through zone 57 is reached. Pixel sets 40 thus display an image with perspective appropriate to zone 49, set 41 display the same scene with perspective appropriate to zone 50, and so on. While location 31, or another location, is on, the geometry and optical behavior or the device are identical to the up and down look around version described in my co-pending application, Ser. No. 119,907 now U.S. Pat. No. 4,829,365. 1/270th second later (or less), when locations 31 turn off and locations 32 turn on, an observer in zone 49 will see locations 32 through pixel sets 41, and observer in zone 50 will see locations 30 through sets 42, an observer in zone 51 will see locations 30 through set 34, and so on. Now sets 35 display new parts of the perspective view appropriate to zone 43, sets 36 display portions of a scene with a slightly different perspective appropriate to zone 44, and so on. Again, the optical geometry is identical to the geometry of the system described in my previous application. During each 1/30th second cycle, an observer's eye in zone 43 will see light emitting locations 29, 30, . . . turn on behind pixel sets 34, 35, 36 . . . in succession. Since each set displays part of an image with perspective appropriate to zone 43, the observer will see a complete image with full m by n resolution built up during the 1/30 second cycle Since the blinking of the locations is too fast for the observer to detect, the observer will perceive what appears to be a continuous steady image. The same will be true to observer's eyes located in other zones, so that as the observer moves within zones 43 through 51, with each eye in a different zone, he will see an scene with depth and full m by n resolution that seems to change perspective as he moves, just as a real scene would.

As was stated before, the number of sets of light emitting locations can be varied. Again, the number of zones will be equal to the number of sets of emitting locations. In the extreme case, if there were as many sets as there are pixels on the light valve, only one location will be on at any given time and the device would be identical to the version described in U.S. Pat. No. 4,367,486.

Many LCDs on the market and under development use different sets of pixels with different colored filters over them to provide color. A typical arrangement uses three sets of columns of pixels, one red, one green, and one blue, extending across the pixel area. In my previous application masks are used in combination with stationary light emitting lines to produce 3-D images with such an arrangement of filtered pixels on a color screen. However, when groups of blinking lines are used, as in FIGS. 1-7, masks are not necessary. The lines can be arranged and operated in exactly the same manner as was previously discussed. The only difference is in the fact that the images on transmissive display is split into red, green, and blue components which are displayed on the red, blue, and green pixel columns.

FIGS. 4 and 5 can be used to illustrate the operation of a color unit. In FIGS. 4 and 5, consider panel 4 to be a color display in which pixel columns 19 and 22 possess red filters, 20 and 23 posses green filters, and 21 and 24 posses blue filters. The illuminating lines on panel 1 operate in the manner discussed previously. When lines 1 are on, pixel columns 19 display the red components of parts of an image with perspective appropriate to zone 25 in FIG. 5, columns 20 display green components of an image with perspective appropriate to zone 26, and columns 21 display blue components of an image with perspective appropriate to zone 27, and so on. As the illuminating lines 19–24 go through one cycle of blinking, and observer's eye in any of the zones will see lines of light appear behind all of the pixels of panel 4, and thus will see a complete, full resolution color image built up over the 1/30th second (or less) blinking cycle.

The same will be true for a display that uses patterns of blinking points of light, as is illustrated in FIGS. 6 and 7. Panel 4 can possess columns or patterns of red, blue, and green pixels, and illumination panel 1 can operate as previously discussed, as long as the red components of images are displayed on the red pixels, the green components on the green pixels, and the blue components on the blue pixels, at the appropriate times during the blinking cycle of points 31–39.

The common method of providing color by filtering the light going through transmissive pixels has another drawback in the fact that much of the light is absorbed by the filtering process. When a series of blinking light patterns are used as an illumination source, a different method of producing color is possible. This method does not reduce the amount of light going through the pixels, and thus can result in a brighter display. FIGS. 4 and 5 can again be used to illustrate a method of producing color without filtering.

In FIG. 4, assume that panel 4 is a "black and white" transmissive display panel without color filters. On panel 1, however, line sets 14 and 17 emit red light, line sets 15 and 18 emit green light, and line sets 16 and 19 emit blue light. When sets 14 or 17 are on, all the pixels of panel 4 display the red components of images that are appropriate to zones 25–30. Likewise, when lines 15 and 18 are on, panel 4 displays the green components of the images, and when lines 16 and 19 are on, panel 4 displays the blue components of the images. An observer's eye in any of the zones 25–30 will thus see a complete m/3 by n image made up of alternating red, green and blue columns. Light emitting sites of other shapes, such as dots or points mentioned before, can also be used to create color images provided that one set of sites emits red light, one emits green light and one emits blue light.

Figure 8:
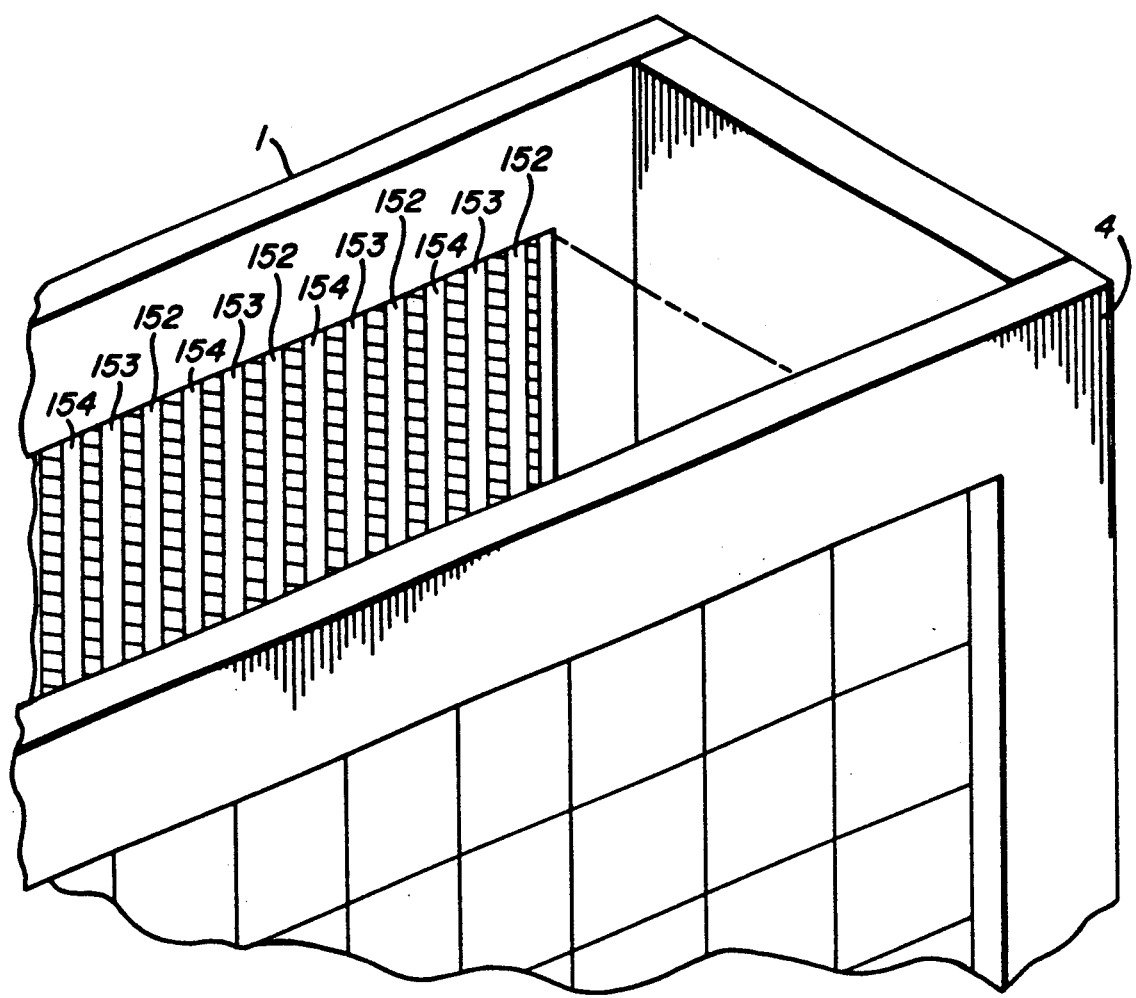
FIG. 8 is a perspective view of a variation of the invention using blinking or moving light emitting regions to increase horizontal resolution of a transmissive display.
Figure 9:
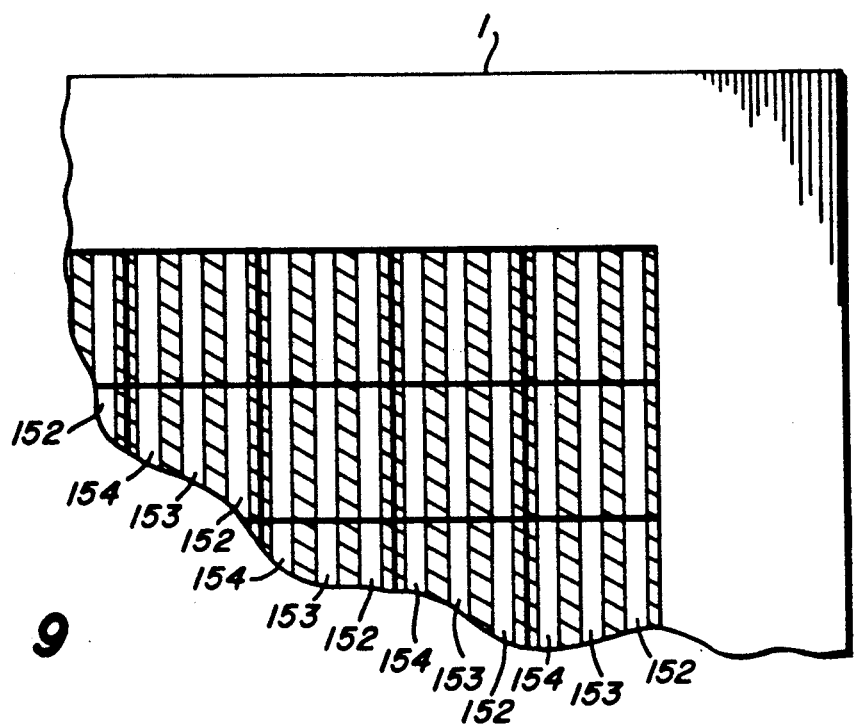
FIG. 9 is a front view of the display unit of FIG. 8, illustrating its operation.

A surface that displays moving patterns of light emitting regions can also be used to increase the resolution of a transmissive display when it displays 2-D images, instead of creating 3-D images. FIGS. 8 and 9 illustrate how this is accomplished.

As shown in FIG. 8 an illumination panel with two or more sets of light emitting lines are once again placed behind a transmissive display. In FIG. 8, 3 sets of lines, 152, 153, and 154 are shown. There are two differences between the best arrangement of the light emitting surface 1 for this application, and its arrangement in the autostereoscopic applications discussed earlier. First of all, it is best if the light emitting regions are situated closer to the transmissive display pixels. Ideally, the light emitting surface would be mounted directly on the back of the transmissive pixel layer, but this is difficult to achieve with present off the shelf transmissive displays, which for the most part are liquid crystal devices with a layer of transmissive pixels sandwiched between electrode layers and two pieces of thin glass. Given this LCD construction, the light emitting surface can more easily be mounted on the outside glass surface to the rear of the pixel layer, at a typical distance of about 1 mm from the pixels. Nevertheless, the device is usable if the emitting surface to pixel distance is similar to that of FIGS. 1 and 2, on the order of 5 mm.

Another difference between the arrangement of FIG. 8 and that of FIGS. 2 and 4 is that the light emitting regions are closer together, so that at any instant an observer situated with his or her eyes at plane 7 sees lines behind all of the pixels with their left eye, and the same lines behind all of the pixels with his or her right eye. Thus, the observer sees all pixels with both eyes, and no 3-D effects are observed—instead the transmissive display provides the same high resolution images to both eyes.

Figure 10:
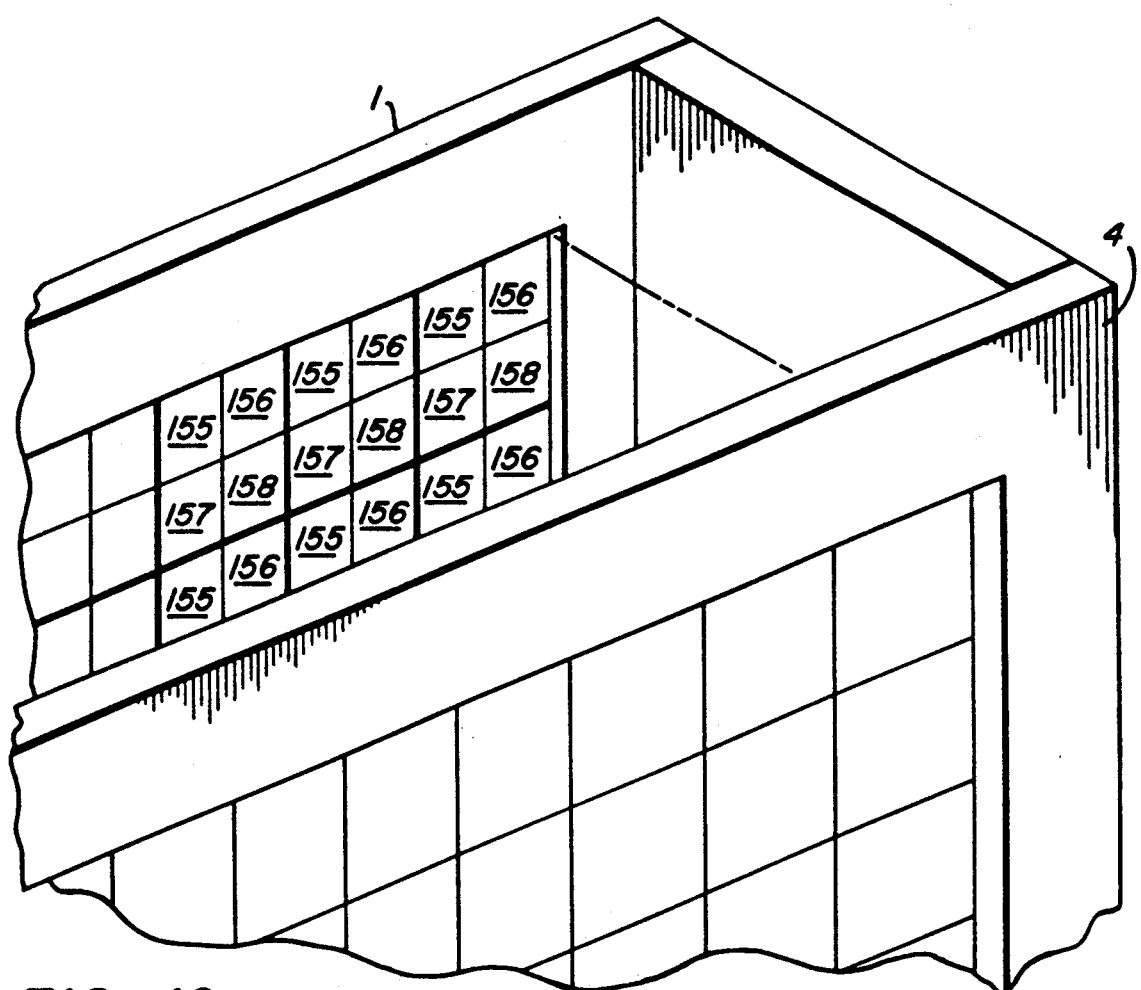
FIG. 10 is a perspective view of a variation of the device of FIG. 8 that uses moving or blinking light emitting regions to increase both horizontal and vertical resolution of a transmissive display.

Still another difference is that, if the light emitting surface is mounted at or near the pixel layer, the light emitting lines need not be thin lines or small points. Rather, each set of emitting regions can occupy most of the space that is not occupied by the other emitting regions, with little or no dark space between the regions, as is shown in FIG. 10.

In light of these differences, it is desirable to include a mechanical mounting for the light emitting surface 1 that allows it to move between two positions, one at a typical distance of about 5 mm for 3-D applications, and the other at the rear surface of the transmissive display, for 2-D applications.

Light emitting line sets 152, 153, 154 turn on and off in succession, so that first set 152 is turned on, then set 152 turns off and set 153 turns on, and so on with set 154 and the set 152 again. When set 152 is on, the transparency of each pixel on the LCD is changed to provide the correct apparent brightness for each of the illuminated regions of set 152 so that an observer sees an image composed of light emitting regions 152. When set 153 is on, each pixel again changes its transparency so that the observer sees different parts of the same image made up of regions 152, and so on with light emitting region 154. Thus, during each cycle, a complete m by 3 n image is built up from the interaction of the m by n pixel transmissive display and the sets of light sources 152, 153, 154.

The arrangement of FIGS. 8 and 9 can also be used in conjunction with an illumination panel made up of several sets of square or circular light emitting regions, similar to those shown in FIG. 5. This arrangement is illustrated in FIG. 10. Here four sets of light emitting regions, 155, 156, 157, 158, are shown. As before, they are spaced apart at such a distance that an observer with his or her eyes near plane 7 in FIG. 11 sees one light emitting region behind each of the pixels of the LCD at any given moment.

The light emitting sets 155, 156, 157, 158 turn on and off in succession, so that first set 155 is turned on, then light 155 turns off and set 156 turns on, and so on with sets 157 and 158. When set 155 is on the transparency of each pixel on the LCD is changed to provide the correct apparent brightness for each of the illuminating regions 157 so that an observer sees an image composed of regions 155. When set 156 is on, each pixel again changes its transparency so that the observer sees different parts of the same image made up of regions 156, and so on with light emitting sets 157 and 158. Thus, during each cycle, a complete 2 m by 2 n image is built up from the interaction of the m by n pixel transmissive display and the four sets of sources 155, 156, 157, 158.

Figure 11:
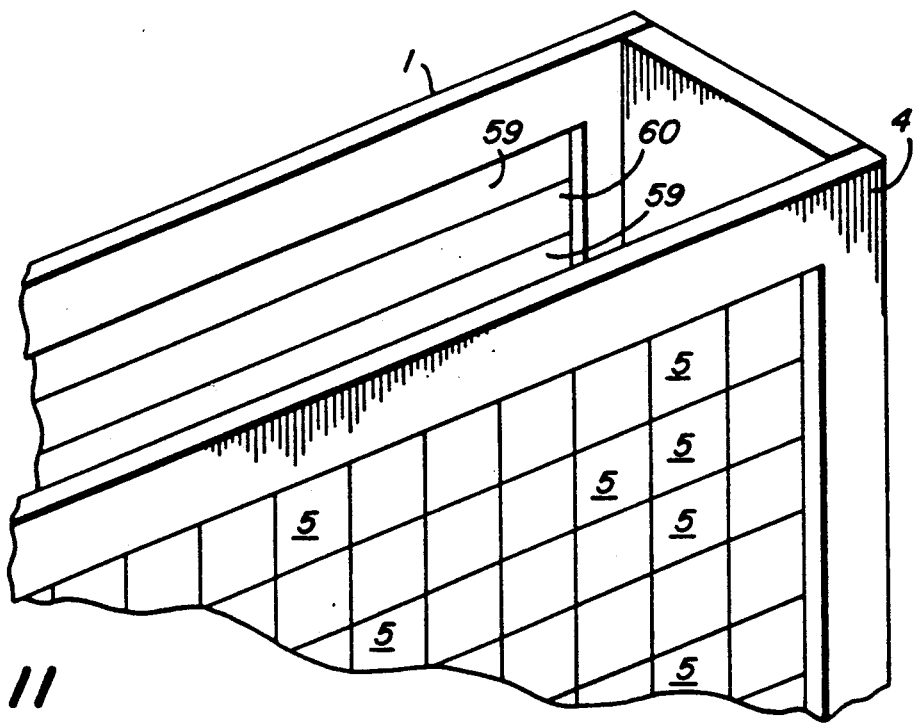
FIG. 11 is a perspective view of a variation of the device of FIG. 8 using moving or blinking light emitting regions to increase the vertical resolution of a transmissive display.

FIG. 11 illustrates another preferred embodiment that is particularly useful for video applications. Standard video systems operate in such a way that half of the image is scanned to every other row of the display device (say, the odd rows), and then the remainder of the image is scanned to the remaining (even) rows. The light emitting line and LCD arrangement shown in FIG. 11 is designed to be compatible with this sort of scanning arrangement, and allows a m by 2 n image to be created with an m by n LCD operating at 60 frames per second, in conjunction with a light emitting line light source. In FIG. 11, the vertical lines or small square light emitting sources of the illumination panel 1 in FIGS. 9 and 10 are replaced by two sets of horizontal linear light sources 59 and 60. The sets 59, behind the top half of the pixels 5 of the light valve array 4, are turned on then off, and then the sets 60, behind the bottom half of each pixel 5 are turned on and then off.

The timing of the blinking lines is synchronized with the video signal from the video input in such a way that when, during the first 1/60th second half of the 1/30th second frame, when images would normally be written to the odd rows of a display, lines 59, behind the top half of the pixels 5, are on. The electronic signals are used to address every row of the LCD. Next, when the signals for the even rows of the image are sent to all rows of the LCD display, lines 60 are displayed, which are situated behind the bottom half of the pixels. Thus, during every 1/30th second cycle, the observer sees a complete m by 2 n resolution image built up from the m by n resolution LCD.

When used with a typical color LCD display, which possesses alternating columns of red, blue, and green pixels, the operation of the device is FIG. 8 could be identical to the previous discussion. It is also possible to create color by using sets of red, green, and blue light emitting lines or points, arranged so that at least one red, one green, and one blue light emitting region is seen behind each pixel, and these different colored regions are turned on and off in succession. FIGS. 8 and 9 can be used to illustrate this technique.

In this case, each of the three sets of light emitting regions, 152, 153 and 154 on panel 1 in FIGS. 9 and 10 emit light of a different color. Regions 152 emit red light, regions 153 emit green and regions 154 emit blue light. As before, sets 152, 153 and 154 flash on, then off in succession. When set 152 is on, pixels 5 display the red component of an image. When sets 153 are on, pixels 5 display the green component of an image, and when sets 154 are on, pixels 5 display the blue component of the image.

Figure 12:
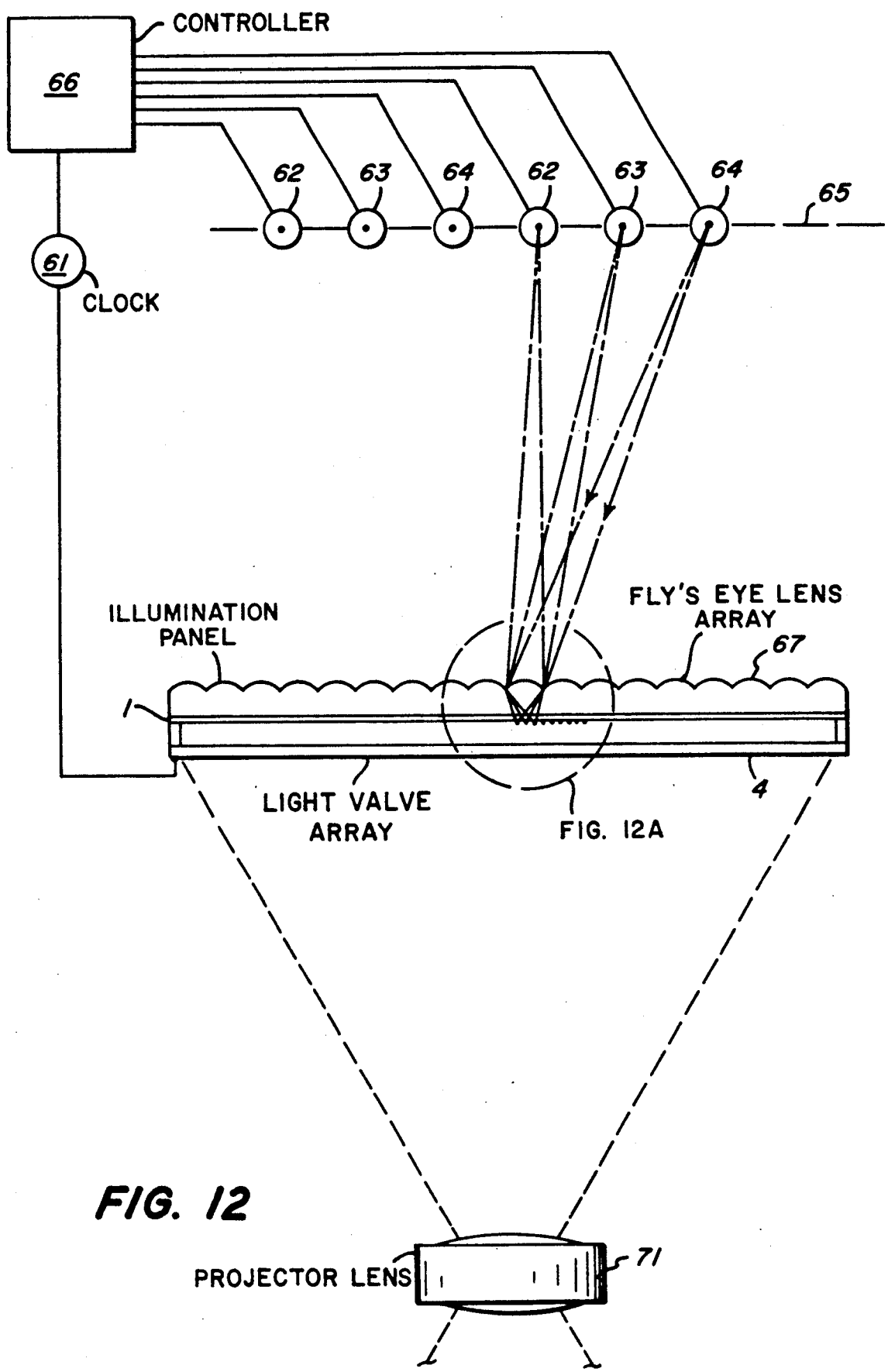
FIG 12 illustrates a method of creating a set of very small light emitting regions for use with the devices shown in FIGS. 1-11.

There are many ways to create the multiple sets of rapidly blinking or moving thin lines illustrated in FIGS. 1–11. Some include thin film electroluminescent panels with light emitting regions in the form of lines, squares, or other shapes, TFEL edge emitter arrays, fiber optic lines, and gasses such as neon trapped in straight channels etched in glass. Nevertheless, it may be difficult and expensive to create sets of very small light emitting regions for use with very high resolution displays with very small pixels. FIG. 12 shows an alternate easy and inexpensive method of creating very large numbers of very small light emitting regions.

Figure 12A:
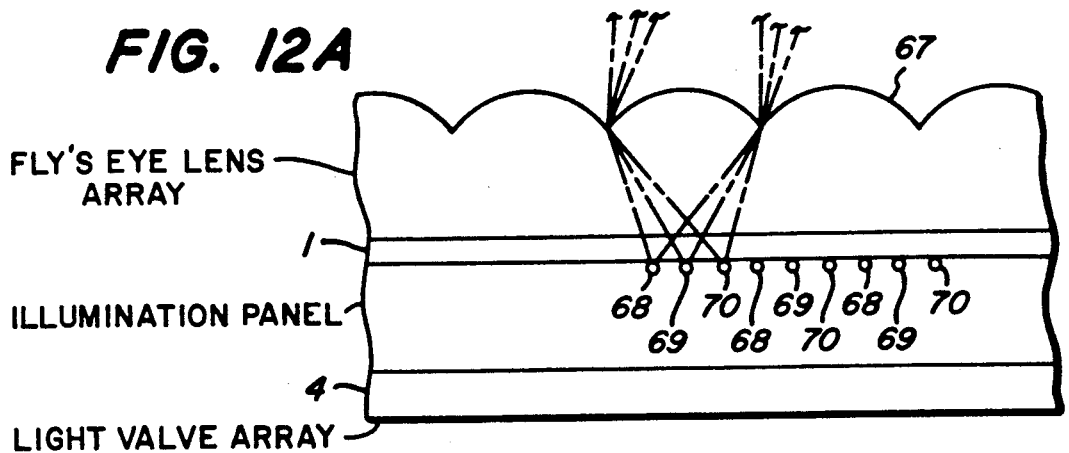
FIG. 12a is an expansion of a portion of FIG. 12 showing the lenset of the fly eye lens array and images on the display unit in greater detail.

A number of large light sources, 62, 63 and 64, such as common flash lamps, are arranged in a light plane 65. In FIG. 12, 3 sets of light sources are shown, but any number might be used. The lamp sets are operated by a controller, 66 which causes set 62 to blink on and off, the set 63 to blink on and off, and then set 64 to blink on and off. Each lenslet of a fly's eye lens array, 67, forms small images 68, 69, 70 of light sources 62, 63 and 64 on a surface 1, which may be a diffusing surface FIG. 12a is an expanded segment of a portion of the lenslet of a fly's eye array 67 and the display unit of FIG. 1 for showing greater clarity of the path of the image. A lenticular lens can be used in place of fly's eye lens 67 if light emitting lines are to be produced. Illumination panel surface 1, which displays multiple sets of blinking light emitting regions, is situated behind light valve array 4. The images shown on light valve array 4 are synchronized with the blinking light sources 62–64 by means of clock 61. The blinking light sources shown in FIG. 12 may be replaced by steady shining light sources that are made to appear to blink by means of mechanical or electro-optical shutters placed between light sources 62, 63, 64 and the fly's eye lens array 67.

A projection lens, or lenses, 71 may also be included in the system so that images on the transmissive display can be projected onto a screen for viewing by a large audience. Such a projection lens can be used with any of the configurations of FIGS. 8–11, and with any of the methods of creating light emitting regions discussed above.

Figure 16:
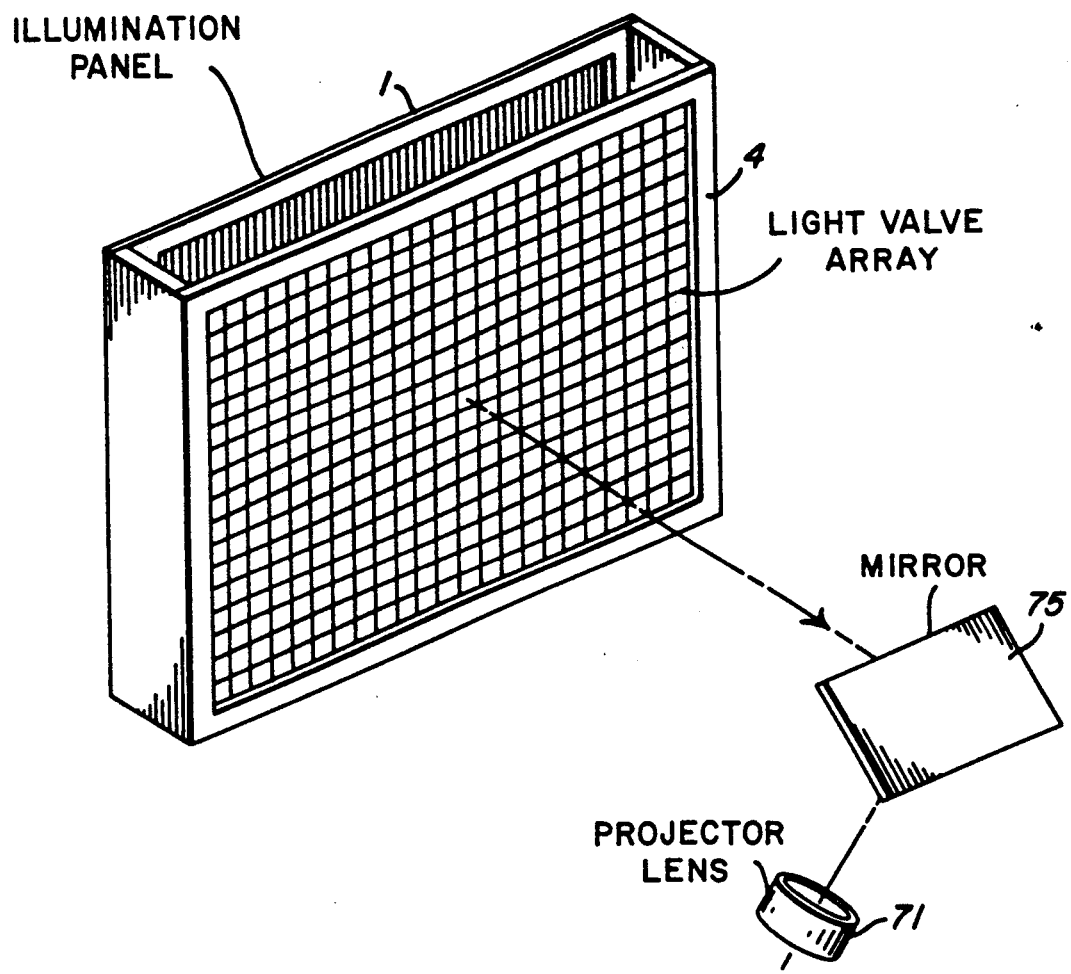
FIG. 16 illustrates the use of this invention as shown in FIGS. 8–11 in forming images for tangible copy reproduction systems.
Figure 16:
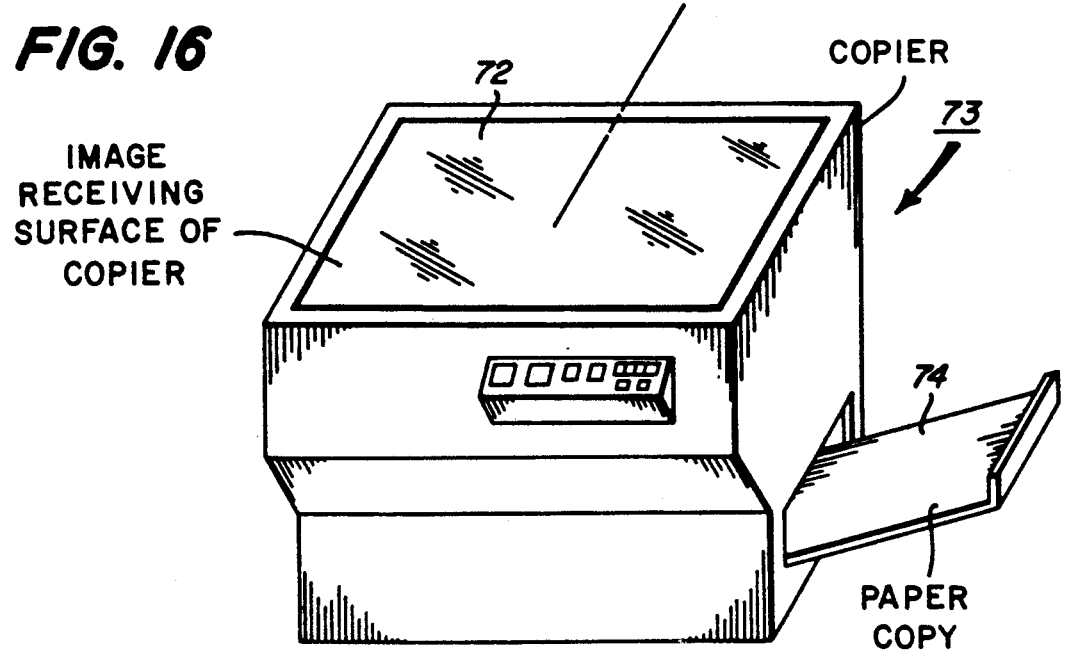

A projection lens, or lenses, 71 may also be used to project images of the display of this invention on to a hard copy information or image reproduction media FIG. 16 illustrates the use of the device of FIG. 8 wherein the image shown on the light valve array 4 is focused by lens 71 on the image receiving surface (or copy platform) 72 of a xerographic copier 73. The copier 73 processes the projected image in the normal manner and fixes it on a tangible media, e.g. paper 74. In FIG. 16 an optional mirror 75 is shown. The mirror 75 is utilized when due to mechanical design cosiderations the display unit can not be directly located over the copier 73 and the image pathway must be bent in order to project properly on the image receiving surface 72. The copier 73 may be substituted by other image reproduction systems or devices as desired. Thus, in addition to paper 74 of a xerographic copier 73 the media may be acetate film, photographic film, digital recording media, e.g., digital paper developed by Image Data, Inc., stencil masters for mimeograph or gelatin boards, or a laser printer printout and the like. This would allow the rapid production of very high resolution permanent, tangible, so called "hard", copies of visual or other information.

The number of images that a transmissive display can show per second is limited by the pixel response time—the length of time it takes the pixels of the display to turn on and off. In order to use the techniques disclosed in this application while keeping display flicker within acceptable limits, the display must produce an image or set of images every 1/30th of a second or less. Thus, given a transmissive light valve array that is capable of displaying n images per second, where n is greater than 30, a stereoscopic system providing n/30 viewing zones can be constructed, or a 2-D display with a resolution equal to n/30 times that of the transmissive light valve can be constructed.

At present, the fastest transmissive displays are the liquid crystal type. TFT (Thin Film Transistor) and LCDs with pixel response times on the order of 2 milliseconds exist in some development laboratories. Such response times would allow a frame rate of about 500 frames per second. At this frame rate, sixteen zone stereoscopic systems can be constructed using the techniques illustrated in FIGS. 1-7, or displays with up to sixteen times the native LCD resolution can be constructed using the techniques illustrated in FIGS. 8-10.

It is also necessary to provide the electronics to drive the display at high frame rates. The fastest controller board currently on the market, which is sold by Cirrus Logic, can drive an LCD display at 120 frames per second to provide flicker free viewing. Such a frame rate would allow one to construct a full resolution display providing up to four viewing zones, or a display having up to four times the LCD resolution. Faster LCDs and other types of transmissive displays, along with faster drivers, can be expected to be developed in the future.

Figure 13:
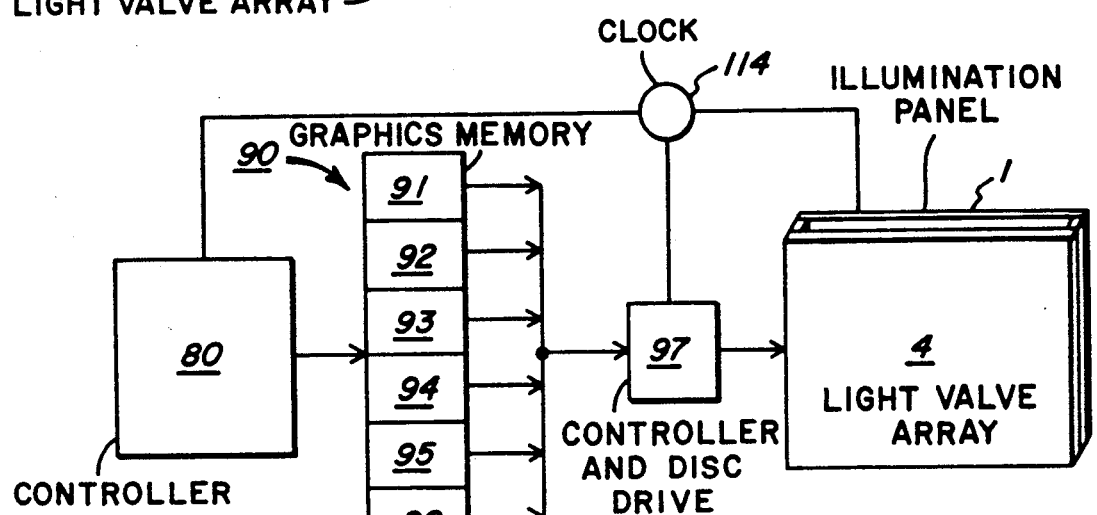
FIG. 13 illustrates the use of this invention as shown in the above FIGS. 1–11 as a computer display.

The devices illustrated in FIGS. 1-12 can be used as displays for a number of applications, and can receive their information in a number of ways. FIG. 13 illustrates how the devices can be used with a computer to display computer generated images. A computer, 80, performs the mathematical calculations necessary to write image information into a graphics memory, 90. This memory may be divided into several sections, 91-96. Each section is devoted to storing one of the images that is intended for viewing in one of the zones in front of display 4. Six sections are shown, but in practice any number, from two to several, e.g., a dozen, might be used, depending on the number of zones in front of display 4. If the display is being used in 2-D mode, each section of memory can be devoted to storing one of the sections of images that is displayed when one of the light emitting sets on panel 1 is on. Controller and driver electronics, 97, take information from the memory and use that information to change the transparency of pixels on display 4 to generate images. A clock, 114, synchronizes the readout and display of images with the blinking regions on panel 1.

Figure 14:
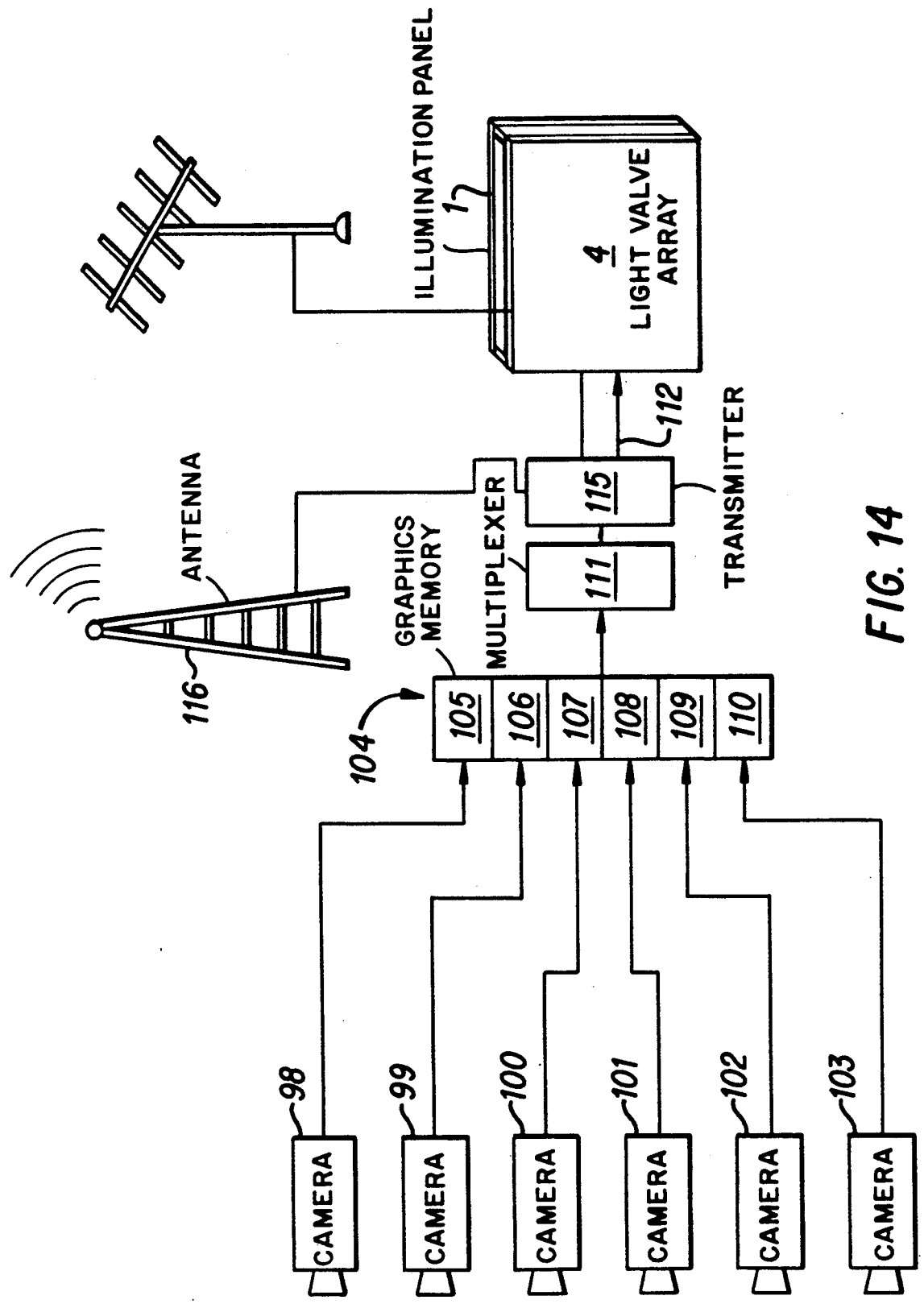
FIG. 14 illustrates the use of this invention as shown in FIGS. 1–7 as a display for a remote television system.

FIG. 14 illustrates how the displays of FIGS. 1-7 can be used as receivers for televised information. A series of television cameras, 98-103 generate images of some scene. One camera is used to create an image for each of the viewing zones in front of display 4. Here six cameras are shown, but in practice any number, from two to over a dozen might be used, depending on the number of zones that display 4 and panel 1 can produce. In most applications it would be best if all of the television cameras were synchronized so that all frames are taken at the same time, and stored in a graphics memory 104, which may contain several sections, 105-110, one for each image. These images are then multiplexed by multiplexer 111 and sent to display 4 by transmitter 115, via a cable connection 112 or electromagnetic emissions from an antenna 116. A synchronization signal is also broadcast, in order to synchronize display 4 and illumination panel 1 with the signals from 115.

Figure 15:
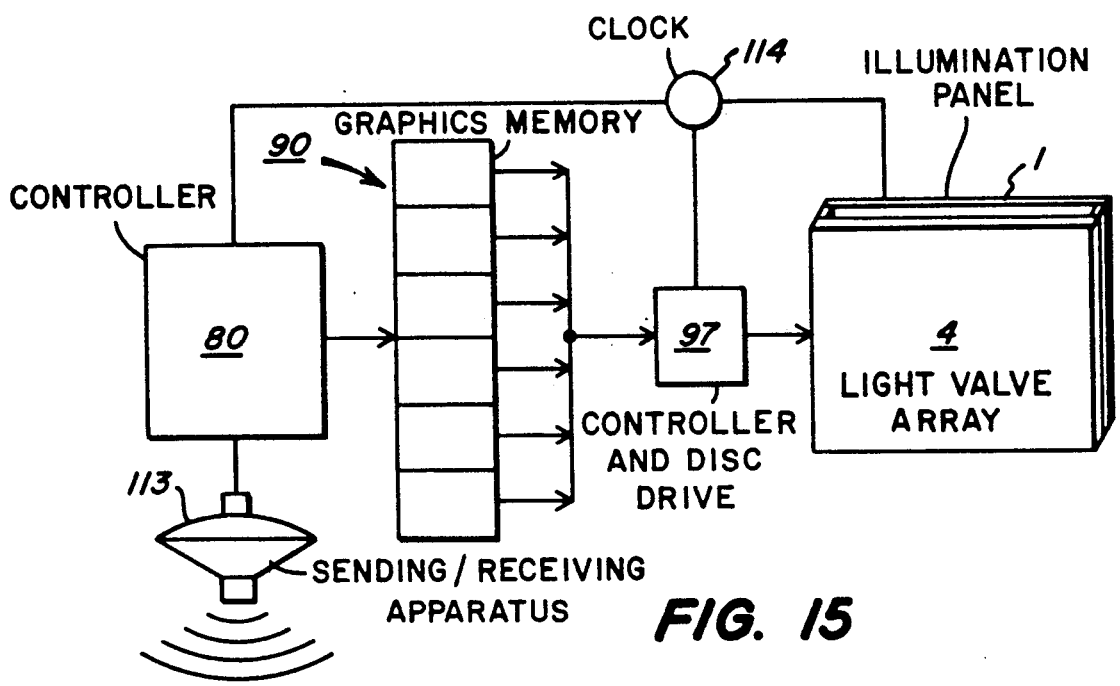
FIG. 15 illustrates the use of this invention as shown in FIGS 1–11 for a radar/sonar system.

FIG. 15 illustrates how the display can be used with equipment that senses distance and direction, such as radar, sonar or laser beam range finding equipment. A sending/receiving apparatus 113, such as a radar dish, scans the environment and receives echoes from object within that environment. A computer, 80, translates the time delays of the echoes into distance information, and in turn translates this into a graphical representation of the positions and shapes of objects sensed by apparatus 113. This representation is placed in the graphics memory 90, where it is read out via the controller and disc drive 97 to light array display 4.

In the previous discussion the light emitting regions described have had the shape of parallel lines, or squares and dots arranged in a raster pattern. Likewise, the transmissive display has been described as having pixels arranged in a raster pattern. In practice, any number of illuminating regions of various shapes could be used in conjunction with transmissive displays with pixels of various shapes and arrangements to produce 3-D images or increase the apparent resolution of the transmissive display. The present application should be considered to encompass such other arrangements.

The foregoing description has been for the purpose of illustration and not limitation. Many other modifications and ramifications will naturally suggest themselves to those skilled in the art based on this disclosure. These are intended to be comprehended as within the scope of this invention.

The embodiments of this invention in which an exclusive property or privilege is claimed are as follows:

1. In an electronic display unit for autostereoscopic viewing or two dimensional high, resolution viewing the improvement which comprises
    (a) a surface that is capable of emitting light from two or more sets of sites,
    (b) means of causing each set to blink on and then off in succession, one set after the other, and to repeat this process continuously, whenever the unit is turned on, and
    (c) a light valve in front of and parallel to said surface, said light valve having individual picture elements on its surface, said light valve being capable of displaying a different set of images every time a different set of light emitting sites flash on.

2. The display of claim 1 wherein the light sites are vertically oriented to form an autostereoscopic display unit.

3. The display of claim 2 wherein the light site is a line of light.

4. The display of claim 2 wherein the light site is a series of individual light spots.

5. The display of claim 1 wherein the light sites are horizontal whereby two dimensional high resolution viewing is achieved.

6. The display of claim 5 wherein the light site is a line of light.

7. The display of claim 5 wherein the light site is a series of individual light spots.

8. The display of claim 1 wherein the light sites are arranged in columns of light sites whereby two dimensional high resolution viewing is achieved.

9. The display of claim 8 wherein the light site is a line of light.

10. The display of claim 8 wherein the light site is a series of individual spots.

11. The display of claim 1 wherein the display is in color and each of the individual picture elements is replaced by three individual picture elements, each one of the elements being tinted for a different one of the three primary colors.

12. The display of claim 1 wherein the each light site is replaced by three light sites, each one of the light sites being tinted for a different one of the three primary colors.

13. The display of claim 1 used in a computer system as the display device for computer generated information.

14. The display of claim 1 used in a television receiving system as the visual display.

15. The display of claim 1 used in radar, sonar and laser beam range finding devices as the visual display for information received.

16. The display of claim 1 used in a permanent, tangible copy reproduction system.

17. The display of claim 16 where in the copy is reproduced on photographic film.

18. The display of claim 16 wherein the copy is reproduced on paper.

19. The display of claim 16 wherein the copy is reproduced on digital recording media.

20. The display of claim 1 used in projection systems as the source of images for projection on to viewing surfaces.

21. A device for producing sets of light emitting regions on a surface comprising
    (a) a surface that is capable of emitting light from two or more sets of sites,
    (b) means of causing each set to blink on and then off in succession, one set after the other, and to repeat this process continuously, when ever the device is turned on,
    (c) a fly's eye or lenticular lens sheet spaced apart from and in front of said light emitting sites, and
    (d) a transparent or translucent imaging surface in front of said lens upon which multiple images of said light emitting sites are formed by said lenticular lens sheet.

22. The device of claim 21 wherein the blinking light sites are replaced by steadily shining light sites and mechanical or electro-optical shutters located between said light sites and said lenticular lens sheet are used to achieve the blinking effect.

23. A method of displaying autostereoscopic or high resolution images which comprises sending a series of modulated electromagnetic signals that are received by a light valve in the display device comprising:
    (a) a surface that is capable of emitting light from two or more sets of sites,
    (b) means of causing each set to blink on and then off in succession, one set after the other, and to repeat this process continuously, whenever the unit is turned on, and
    (c) a light valve in front of and parallel to said surface, said light valve having individual picture elements on its surface, said light valve being capable of displaying a different set of images every time a different set of light emitting sites flash on.

24. The method of claim 23 wherein the electromagnetic signals include signals for indicating color and each light site is replaced by three light sites, each one of the light sites being tinted for a different one of the three primary colors.

25. The method of claim 23 wherein the electromagnetic signals include signals for indicating color and each individual picture element is replaced by three individual picture elements, each one of the three elements being tinted for a different one of the three primary colors.

26. The method of claim 23 wherein the image formed by the display device are projected through a projection lens and on to an image receiving surface of a tangible copy reproduction system and the image so received is fixed in a tangible copy.

* * * * *